(12) United States Patent
Tsujii

(10) Patent No.: US 10,606,530 B2
(45) Date of Patent: Mar. 31, 2020

(54) PRINTING APPARATUS THAT PREVENTS COMMUNICATION BETWEEN COMPONENTS OF THE PRINTING APPARATUS FROM BECOMING IMPOSSIBLE, CONTROL METHOD THEREFOR, AND STORAGE MEDIUM

(71) Applicant: CANON KABUSHIKI KAISHA, Tokyo (JP)

(72) Inventor: Hiroto Tsujii, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/444,436

(22) Filed: Feb. 28, 2017

(65) Prior Publication Data
US 2017/0255427 A1  Sep. 7, 2017

(30) Foreign Application Priority Data
Mar. 3, 2016  (JP) ................................. 2016-041114

(51) Int. Cl.
*G06F 3/12*  (2006.01)
(52) U.S. Cl.
CPC .......... *G06F 3/1236* (2013.01); *G06F 3/1205* (2013.01); *G06F 3/1234* (2013.01); *G06F 3/1285* (2013.01)
(58) Field of Classification Search
None
See application file for complete search history.

(56) References Cited

U.S. PATENT DOCUMENTS

| | | | | |
|---|---|---|---|---|
| 2007/0240004 A1* | 10/2007 | Maeda | ..................... | G06F 1/266 713/322 |
| 2012/0017126 A1* | 1/2012 | Yamano | .............. | G06F 11/0733 714/48 |
| 2012/0176635 A1* | 7/2012 | Niitsuma | ........... | H04N 1/33376 358/1.13 |

FOREIGN PATENT DOCUMENTS

| | | |
|---|---|---|
| JP | 2000326591 A | 11/2000 |
| JP | 2005135195 A | 5/2005 |
| JP | 2012051246 A | 3/2012 |

(Continued)

OTHER PUBLICATIONS

Office Action issued in Japanese Appln. No. 2016-041114 dated Jan. 14, 2020.

*Primary Examiner* — Benny Q Tieu
*Assistant Examiner* — Pawan Dhingra
(74) *Attorney, Agent, or Firm* — Rossi, Kimms & McDowell LLP

(57) ABSTRACT

A printing apparatus which prevents communication from becoming impossible. The printing apparatus has a control unit and a printer unit. At start-up of the control unit, a first communication speed is set as a communication speed for communication between the control unit and the printer unit, and also a predetermined command is transmitted to the printer unit. Whether or not a response to the predetermined command has been received from the printer unit is determined. As a result of the determination, when no response to the predetermined command has been received from the printer unit, a second communication speed different from the first communication speed is set as the communication speed for the communication between the control unit and the printer unit, and also, a reset command is transmitted to the printer unit.

13 Claims, 5 Drawing Sheets

(56) References Cited

FOREIGN PATENT DOCUMENTS

JP 2015153343 A 8/2015

\* cited by examiner

PRINTING APPARATUS THAT PREVENTS COMMUNICATION BETWEEN COMPONENTS OF THE PRINTING APPARATUS FROM BECOMING IMPOSSIBLE, CONTROL METHOD THEREFOR, AND STORAGE MEDIUM

BACKGROUND OF THE INVENTION

Field of the Invention

The present invention relates to a printing apparatus, a control method therefor, and a storage medium.

Description of the Related Art

There is known an MFP which is a printing apparatus that carries out a printing process using obtained image data. The MFP has a printer unit which carries out the printing process and a control unit which controls component elements of the MFP including the printer unit. The control unit obtains a variety of information on, for example, an operating status of the printer unit from the printer unit through data communications to control the printer unit. In the MFP, the same communication speed needs to be set for the control unit and the printer unit so as to enable data communications between the control unit and the printer unit. Accordingly, in the MFP, a matching process is carried out to match the communication speed of the control unit to that of the printer unit at, for example, start-up of the MFP. In this matching process, first, a first communication speed which is relatively low is set for each of the control unit and the printer unit. After that, when it is acknowledged through a communication at the first communications speed that it is possible to set a higher communications speed, a second communication speed higher than the first communication speed is set for each of the control unit and the printer unit. As a result, the same and high communication speed is set for the control unit and the printer unit, and this enables high-speed data communications between the control unit and the printer unit.

The MFP is equipped with a monitoring unit which monitors whether or not the control unit is normally operating, and upon detecting an abnormality in the control unit, the monitoring unit forcefully resets the control unit (see, for example, Japanese Laid-Open Patent Publication (Kokai) No. 2015-153343). When the control unit is reset by the monitoring unit, the first communication speed is set as the communication speed for the control unit as with the case at start-up of the MFP. Namely, in the MFP, the first communication speed is set again for the control unit while the second communication speed is still set for the printer unit. Thus, in the MFP, to match the communication speed of the control unit to that of the printer unit, the control unit sends a setting request signal, which requests setting of a communication speed, to the printer unit so that the communication speed for the printer unit can be changed to the first communication speed.

Since the first communication speed is set for the control unit at this time, the control unit sends the setting request signal through the communication at the first communication speed. However, since the second communication speed is still set for the printer unit, the printer unit cannot receive the setting request signal, and hence the communication speed for the printer unit is not changed to the first communication speed. As a result, a problem arises because communication between the control unit and the printer unit becomes impossible.

SUMMARY OF THE INVENTION

The present invention provides a printing apparatus and a control method therefor which prevent communication from becoming impossible, as well as a storage medium.

Accordingly, the present invention provides a printing apparatus comprising a controller and a printer engine, wherein said controller comprises a first control unit that, at start-up of said controller, sets a first communication speed as a communication speed for communication between said controller and said printer engine and also transmits a predetermined command to said printer engine, a determination unit that determines whether a response to the predetermined command has been received from said printer engine, and a second control unit that, when it is determined that no response to the predetermined command has been received from said printer engine, sets a second communication speed different from the first communication speed as a communication speed for communication between said controller and said printer engine and also transmits a reset command to said printer engine.

According to the present invention, communication is prevented from becoming impossible.

Further features of the present invention will become apparent from the following description of exemplary embodiments (with reference to the attached drawings).

DESCRIPTION OF THE EMBODIMENTS

Hereafter, an embodiment of the present invention will be described in detail with reference to the drawings.

In the following description of the present embodiment, it is assumed that the present invention is applied to an MFP which is a printing apparatus. The present invention, however, should not necessarily be applied to an MFP but may be applied to any apparatuses as long as they have a plurality of component elements which carry out data communications while switching between at least two communication speeds.

Figure 1:
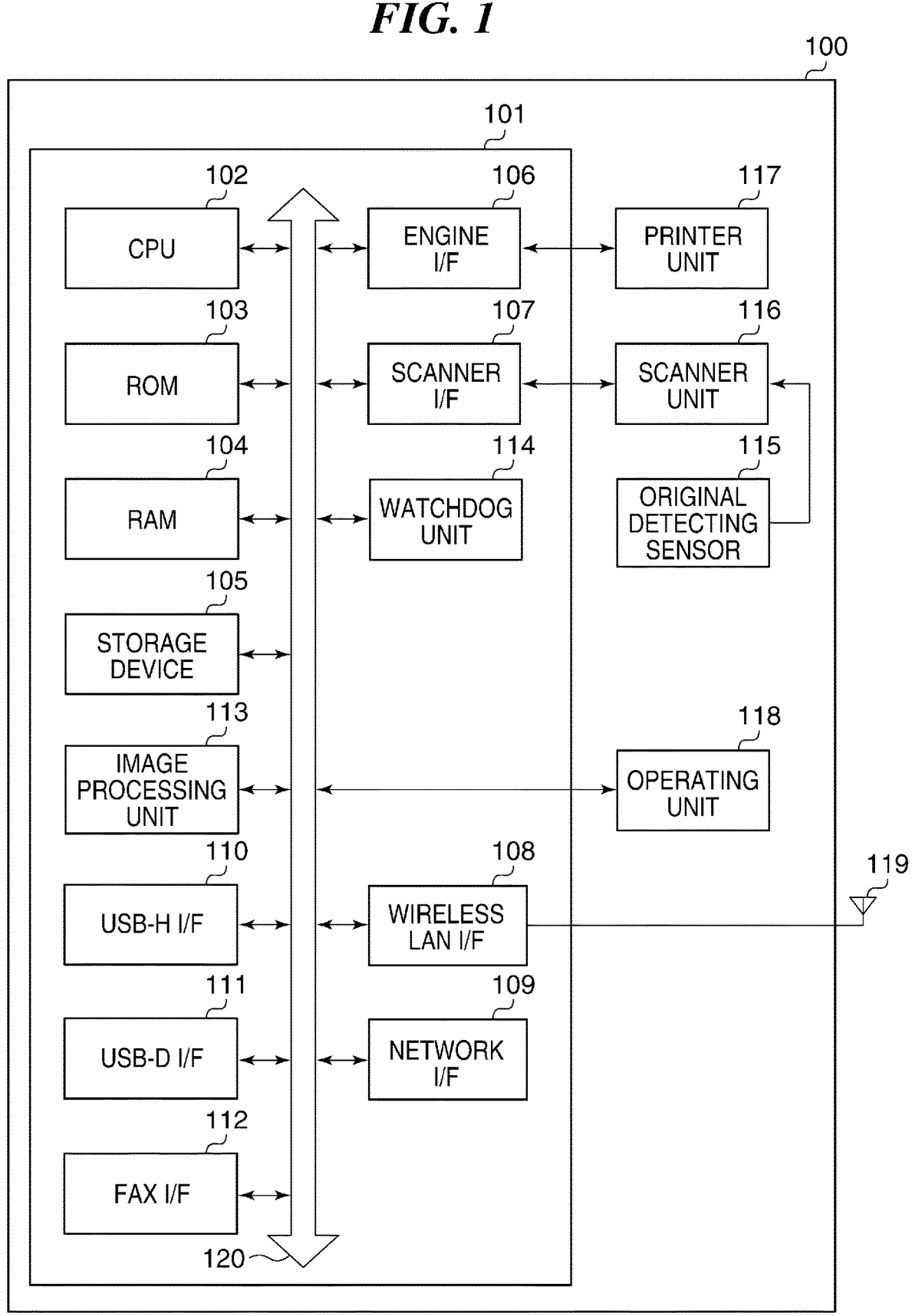
FIG. 1 is a block diagram schematically showing an arrangement of an MFP which is a printing apparatus according to an embodiment of the present invention.

FIG. 1 is a block diagram schematically showing an arrangement of an MFP 100 which is a printing apparatus according to the embodiment of the present invention.

Referring to FIG. 1, the MFP 100 has a control unit 101 (controller), an original detecting sensor 115, a scanner unit 116, a printer unit 117, an operating unit 118, and a wireless LAN antenna 119. The control unit 101 is connected to the scanner unit 116, the printer unit 117, the operating unit 118, and the wireless LAN antenna 119, and the original detecting sensor 115 is connected to the scanner unit 116. The control unit 101 has a CPU 102, a ROM 103, a RAM 104, a storage device 105, an engine I/F 106, a scanner I/F 107, a wireless LAN I/F 108, a network I/F 109, a USB-H I/F 110, a USB-D I/F 111, a FAX I/F 112, an image processing unit 113, and a watchdog unit 114. The CPU 102, the ROM 103, the RAM 104, the storage device 105, the engine I/F 106, the scanner I/F 107, the wireless LAN I/F 108, the network I/F 109, the USB-H I/F 110, the USB-D I/F 111, the FAX I/F 112, the image processing unit 113, and the watchdog unit 114 are connected to one another via a system bus 120.

Figure 2:
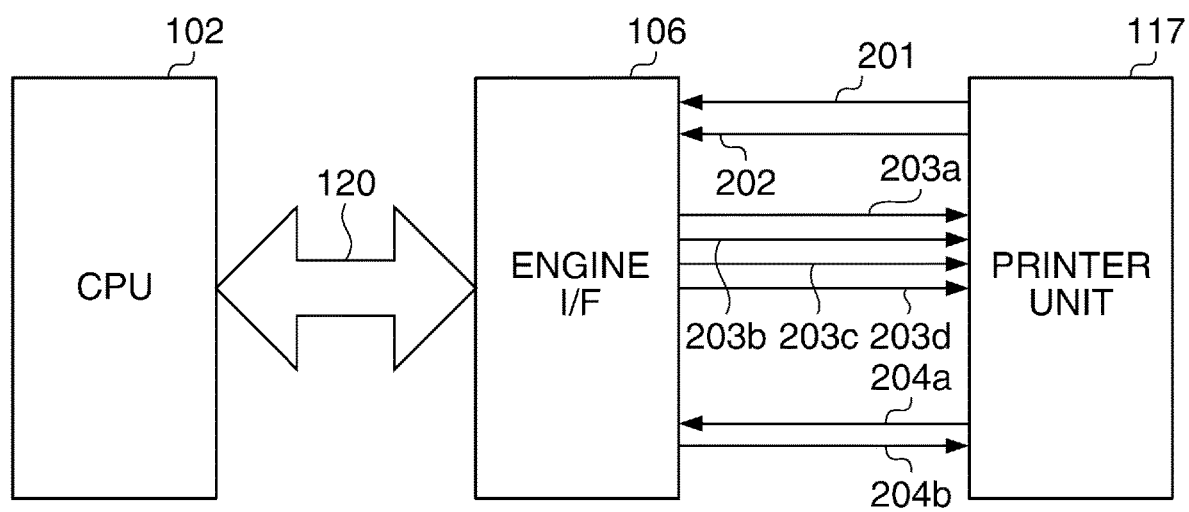
FIG. 2 is a diagram useful in explaining communications carried out by an engine I/F in FIG. 1.

The MFP 100 is able to carry out such processes as printing, scanning, copying, and faxing. The control unit 101 centrally controls the entire MFP 100. The CPU 102 provides various types of control by executing programs stored in the ROM 103. For example, to enable data communications between the control unit 101 and the printer unit 117, the CPU 102 sets the same communication speed for the control unit 101 and the printer unit 117. The ROM 103 stores, for example, a boot program which is executed by the CPU 102. The RAM 104 is used as a work area for the CPU 102 and also used as a temporary storage area for image data, for example. The storage device 105 stores programs and data in relatively large data amounts. The engine I/F 106 carries out data communications with the printer unit 117, and the engine I/F 106 and the printer unit 117 transmit and receive a plurality of signals to and from each other. For example, the engine I/F 106 and the printer unit 117 transmit and receive a vertical synchronization signal 201, a horizontal synchronization signal 202, image data signals 203a to 203d, and UART (universal asynchronous receiver transmitter) signals 204a and 204b to and from each other as shown in FIG. 2. The vertical synchronization signal 201 and the horizontal synchronization signal 202 are signals for making the timing of printing on a sheet synchronized between the CPU 102 and the printer unit 117. The image data signals 203a to 203d are yellow, magenta, cyan, and black image data signals, respectively. The UART signals 204a and 204b are a TX signal and an RX signal, respectively, for sending and receiving status information on, for example, an operating status of the printer unit 117.

The scanner I/F 107 carries out data communications with the scanner unit 116. The wireless LAN I/F 108 carries out data communications with an apparatus which is capable of wireless communications via the wireless LAN antenna 119. The network I/F 109 carries out data communications with some apparatuses connected via a LAN connector, not shown. The USB-H I/F 110 carries out data communications with a device such as a USB memory connected via a USB connector, not shown. The USB-D I/F 111 carries out data communications with a PC or the like connected via a USB connector, not shown. The FAX I/F 112 carries out facsimile communications with an apparatus connected to a public network. The image processing unit 113 subjects image data to image processing such as image rotation, image compression, resolution conversion, color space conversion, and gray scale conversion.

Figure 3:
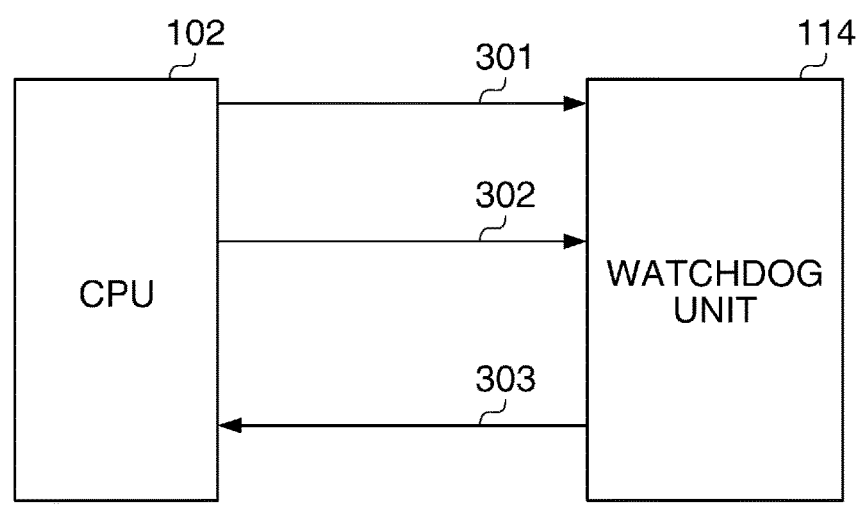
FIG. 3 is a diagram useful in explaining communications between a CPU and a watchdog unit in FIG. 1.

The watchdog unit 114 carries out a monitoring process for the control unit 101, in which it monitors whether or not the control unit 101 is normally operating. In the monitoring process for the control unit 101, for example, the watchdog unit 114 determines whether or not the control unit 101 is normally operating by monitoring how the control unit 101 is carrying out a control process for the scanner unit 116. Upon receiving an enable signal 301 and a clear signal 302 in FIG. 3 transmitted from the CPU 102 in response to starting of the control process for the scanner unit 116, the watchdog unit 114 starts the monitoring process for the control unit 101. The enable signal 301 enables the watchdog unit 114, and the clear signal 302 clears a timer, not shown, provided in the watchdog unit 114. Upon detecting an abnormality in the control unit 101, the watchdog unit 114 transmits an operation reset signal 303, which orders execution of an operation reset process in which the control unit 101 is reset, to the CPU 102. As a result, the control unit 101 is subjected to a restarting process, and settings on the control unit 101 are cleared.

The original detecting sensor 115 detects whether or not an original is placed on an original platen glass, not shown, and notifies the scanner unit 116 of a detection result. The scanner unit 116 reads an original placed on the original platen glass, not shown, and generates image data. The printer unit 117 is a printer engine, which carries out a printing process, and prints image data, which is generated by the scanner unit 116 or the like, on a sheet. The printer unit 117 also controls supply of power to the control unit 101. The operating unit 118 displays a setting screen for configuring settings on the MFP 100 and also receives input information input through operation on the operating unit 118 by a user.

Figure 4:
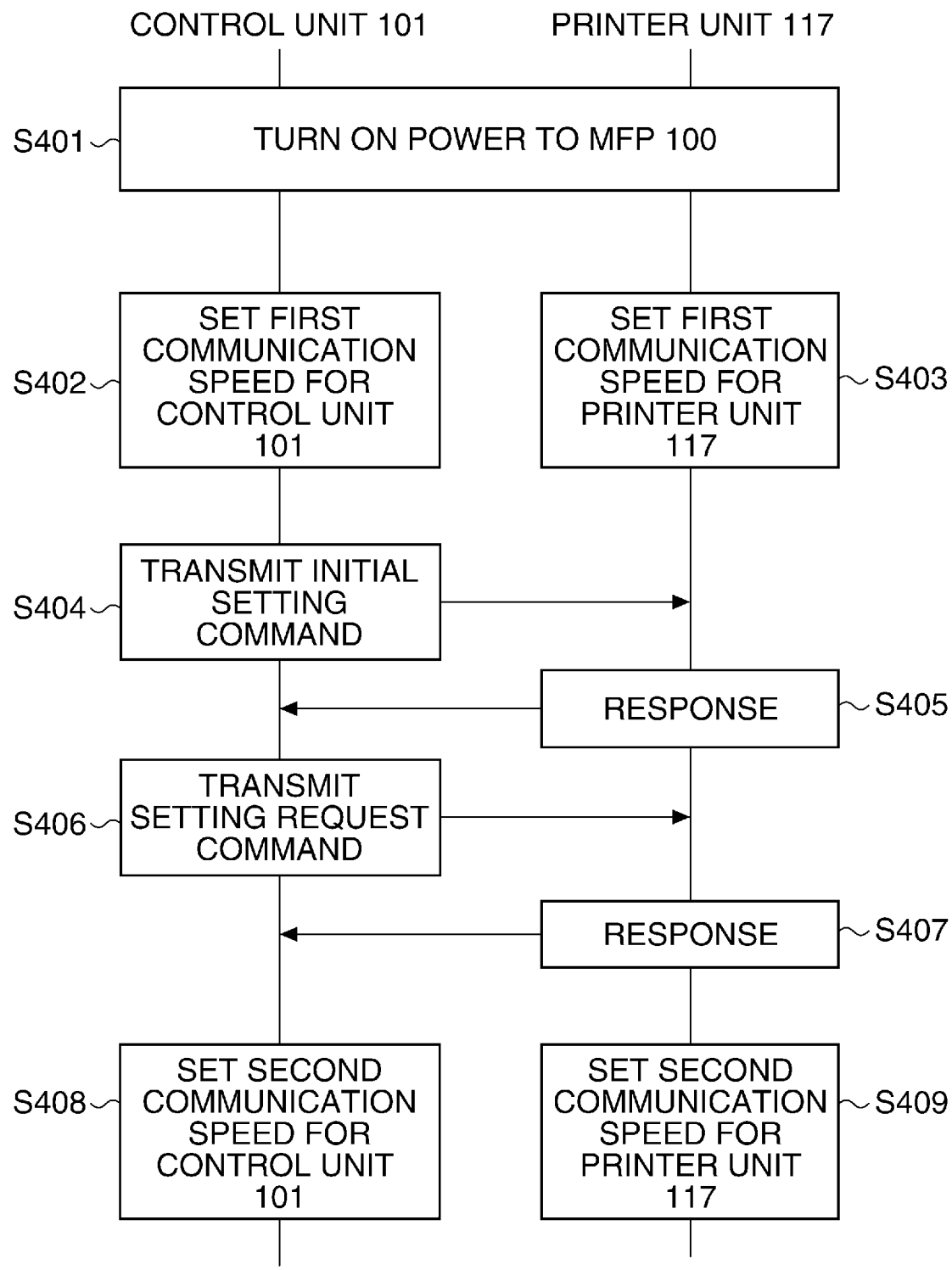
FIG. 4 is a timing chart showing the procedure of an initial setting process which is carried out by the MFP in FIG. 1.

FIG. 4 is a timing chart showing the procedure of an initial setting process which is carried out by the MFP 100 in FIG. 1.

The process in FIG. 4 is carried out by the CPU 102 executing a program stored in the ROM 103 or the storage device 105 and based on an assumption that it is carried out at start-up of the MFP 100.

Referring to FIG. 4, first, when the power to the MFP 100 is turned on (step S401), the CPU 102 sets a first communication speed, which is relatively low, for the control unit 101 (step S402). The first communication speed is determined in advance and for example, 9600 bps. Next, the CPU 102 sets the first communication speed, which is the same as the first communication speed set for the control unit 101, for the printer unit 117 as well (step S403). This enables communications at the first communication speed between the control unit 101 and the printer unit 117. Then, the CPU 102 transmits an initial setting command (predetermined command), which is for configuring initial settings on the MFP 100, to the printer unit 117 through a communication at the first communication speed (step S404). When the printer unit 117 responds to the initial setting command (step S405), the CPU 102 transmits a setting request command, which requests setting of a higher communication speed, to the printer unit 117 through the communication at the first communication speed (step S406). When the printer unit 117 responds to the setting request command (step S407), the CPU 102 sets a second communication speed, which is higher than the first communication speed, for the control unit 101 (step S408). The second communication speed is determined in advance based on communication capabilities of the control unit 101 and the printer unit 117 and for example, 38400 bps. In the present embodiment, one of the first communication speed and the second communication speed is set for the control unit 101 and the printer unit 117. The CPU 102 then sets the second communication speed, which is the same as the second communication speed set for the control unit 101, for the printer unit 117 as well (step S409). This enables communications at the second communication speed, which is higher than the first communication speed, between the control unit 101 and the printer unit 117. After that, the CPU 102 ends the present process.

Figure 5:
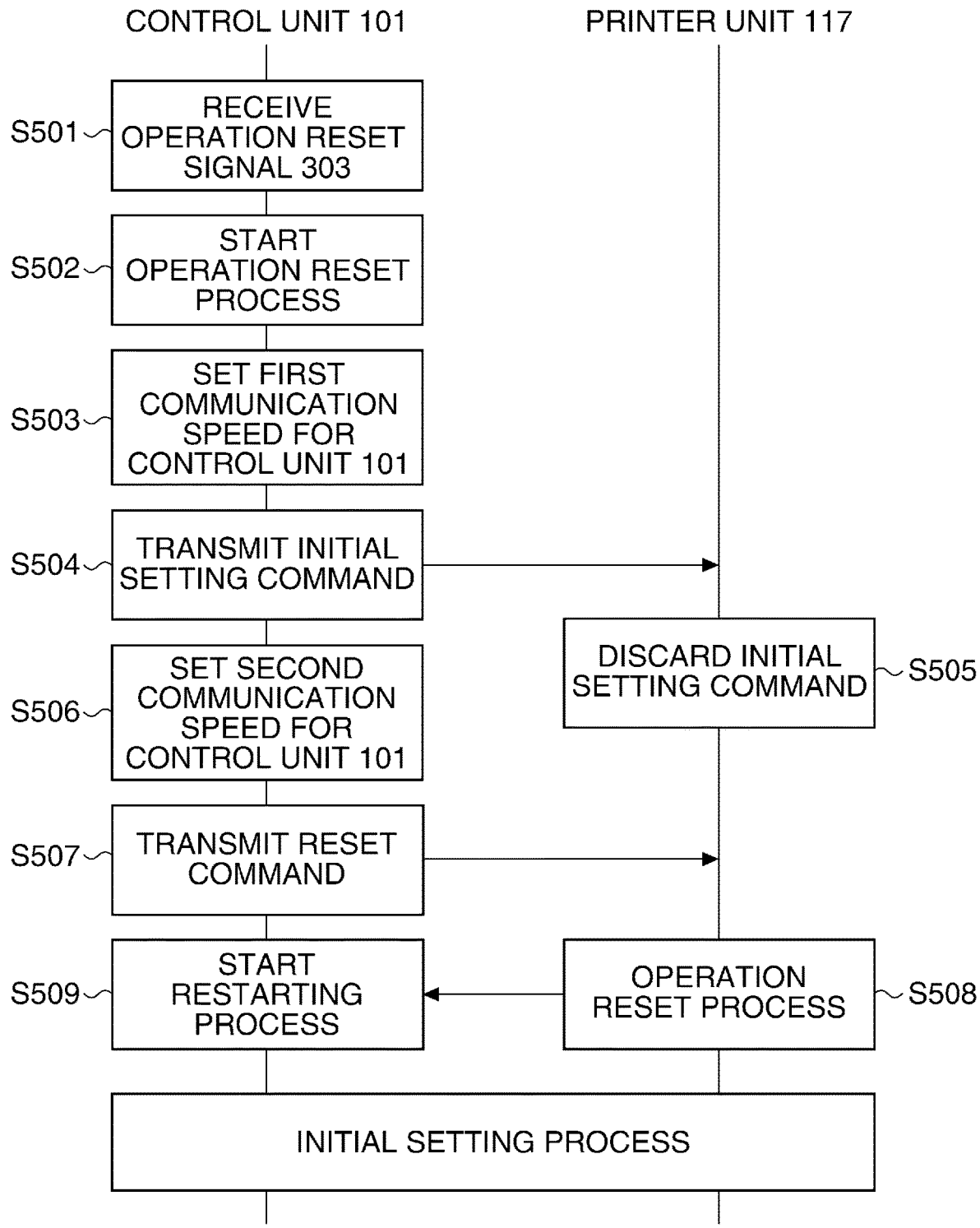
FIG. 5 is a timing chart showing the procedure of a reset process which is carried out by the MFP in FIG. 1.

FIG. 5 is a timing chart showing the procedure of a reset process which is carried out by the MFP 100 in FIG. 1.

The process in FIG. 5 is carried out by the CPU 102 executing a program stored in the ROM 103 or the storage device 105 and based on an assumption that it is carried out after the process in FIG. 4 described above is completed.

Here, in the MFP 100, when the watchdog unit 114 detects an abnormality in the control unit 101, the operation reset process for the control unit 101 is carried out to restart the control unit 101. In this case, after the control unit 101 is restarted, the first communication speed is set as a communication speed for the control unit 101. Namely, in the MFP 100, the first communication speed is set again for the control unit 101 while the second communication speed is still set for the printer unit 117. Thus, to match the communication speed for the control unit 101 to that for the printer unit 117, the control unit 101 transmits an initial setting command to the printer unit 117. Since the first communication speed is set for the control unit 101 at this time, the control unit 101 transmits the initial setting command to the printer unit 117 through the communication at the first communication speed, but the second communication speed is still set for the printer unit 117. Therefore, the printer unit 117 cannot receive the initial setting command, and the communication speed for the printer unit 117 is not changed to the first communication speed. As a result, a problem arises because communication between the control unit 101 and the printer unit 117 becomes impossible.

To deal with this problem, in the present embodiment, when the first communication speed is set for the control unit 101 after completion of the process in FIG. 4, and besides, the printer unit 117 does not respond to the initial setting command, the second communication speed is set for the control unit 101.

Referring to FIG. 5, first, upon receiving the operation reset signal 303 from the watchdog unit 114 (step S501), the CPU 102 starts the operation reset process for the control unit 101 (step S502). The operation reset process for the control unit 101 clears the setting of the second communication speed for the control unit 101. When the operation reset process for the control unit 101 is completed, the CPU 102 sets the first communication speed for the control unit 101 (step S503) and transmits the initial setting command to the printer unit 117 through a communication at the first communication speed (step S504). At this time, the first communication speed is set for the control unit 101, whereas the second communication speed is still set for the printer unit 117. For this reason, the printer unit 117 cannot receive the initial setting command from the control unit 101, causing a notification of a communication error between the control unit 101 and the printer unit 117 to be displayed on the operating unit 118 or the like. To address this problem, in the present embodiment, a process is carried out so as not to display the notification of the communication error. Specifically, the printer unit 117 discards the initial setting command transmitted from the control unit 101 through the communication at the first communication speed (step S505). As a result, the notification of the communication error is not displayed on the operating unit 118 or the like, and a user is saved from having to, for example, carry out an unnecessary recovery process based on the notification of the communication error.

Next, the CPU 102 sets the second communication speed for the control unit 101 when the printer unit 117 does not respond to the initial setting command before a set time period (predetermined time period) of approximately several μ seconds set in advance has elapsed since the initial setting command was transmitted (step S506). Namely, in the present embodiment, when the first communication speed is set for the control unit 101 after the second communication speed is set for the control unit 101 and the printer unit 117, and besides, the printer unit 117 does not respond to the initial setting command, the second communication speed is set for the control unit 101. Here, when in the step S506, the communication speed is changed only for the control unit 101 out of the control unit 101 and the printer unit 117, the communication speed for the control unit 101 and the communication speed for the printer unit 117 do not match, which may cause communication to become impossible. To address this problem, in the present embodiment, the CPU 102 carries out a communication reset process in which it carries out processes in steps S507 to S509 to reset communication between the control unit 101 and the printer unit 117. Specifically, the CPU 102 transmits a reset command, which orders execution of an operation reset process in which operation of the printer unit 117 is reset, to the printer unit 117 through a communication at the second communication speed (step S507). The operation reset process for the printer unit 117 clears the setting of the second communication speed for the printer unit 117. After that, when the operation reset process for the printer unit 117 is completed (step S508), the CPU 102 starts a restarting process for the control unit 101 (step S509). This clears the setting of the second communication speed for the control unit 101 as well and resets communication between the control unit 101 and the printer unit 117. The CPU 102 then carries out the initial setting process in FIG. 4 described above.

Figure 6:
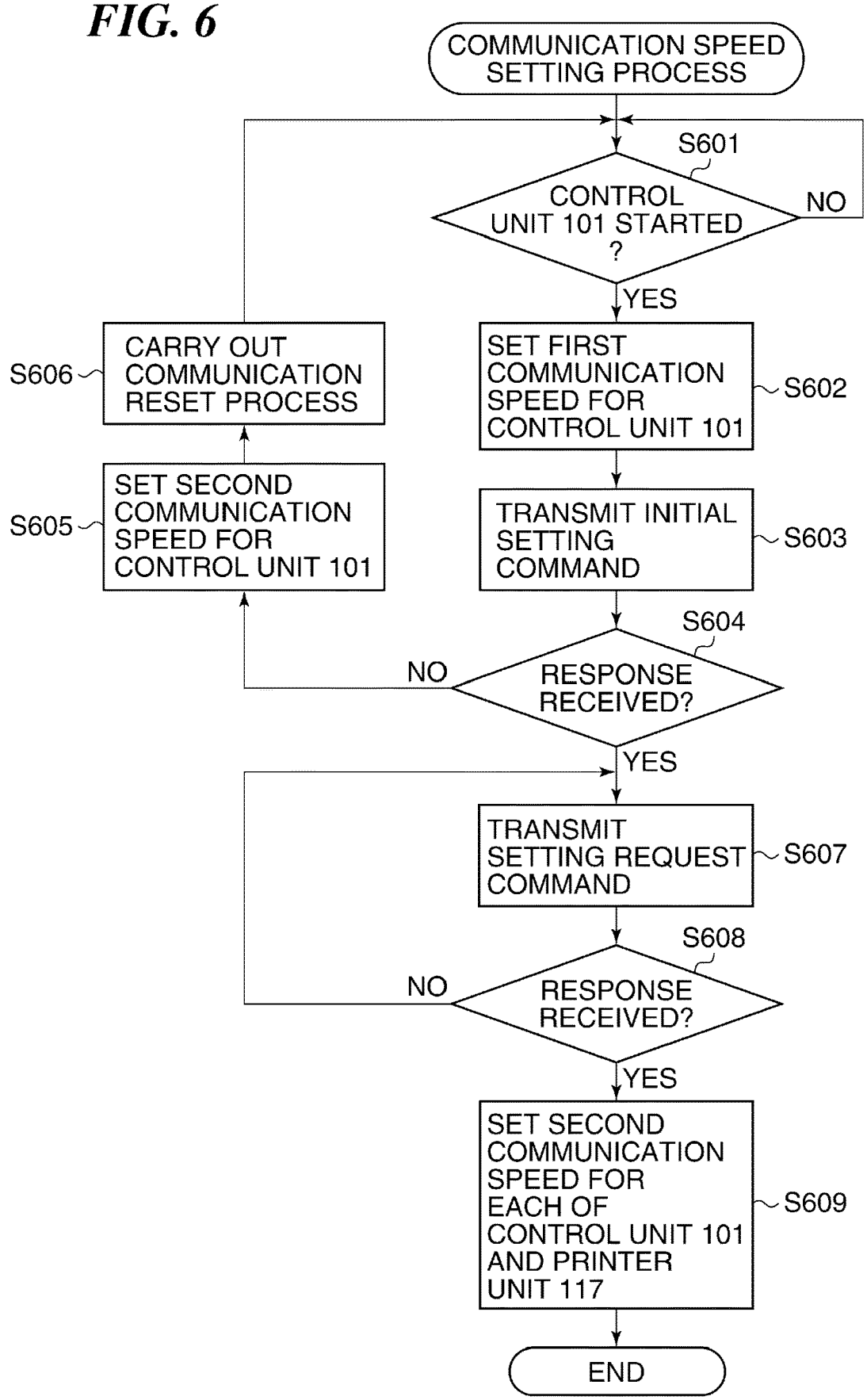
FIG. 6 is a flowchart showing the procedure of a communication speed setting process which is carried out by the CPU in FIG. 1.

FIG. 6 is a flowchart showing the procedure of a communication speed setting process which is carried out by the CPU 102 in FIG. 1.

The process in FIG. 6 is carried out by the CPU 102 executing a program stored in the ROM 103 or the storage device 105.

Referring to FIG. 6, first, when the control unit 101 is started (YES in step S601), the CPU 102 sets the first communication speed for the control unit 101 (step S602) (for example, the step S402 in FIG. 4). At this time, the second communication speed is set for the printer unit 117, or no communication speed is set for the printer unit 117. When no communication speed is set for the printer unit 117, the CPU 102 sets the first communication speed for the printer unit 117 as well (for example, the step S403 in FIG. 4). Next, the CPU 102 transmits an initial setting command to the printer unit 117 through a communication at the first communication speed (step S603) (for example, the step S404 in FIG. 4). When the first communication speed which is the same as that for the control unit 101 is set for the printer unit 117, the printer unit 117 receives and responds to the initial setting command. On the other hand, when the second communication speed different from that for the control unit 101 is set for the printer unit 117, the printer unit 117 can neither receive nor respond to the initial setting command. Then, the CPU 102 determines whether or not a response to the initial setting command has been received from the printer unit 117 (step S604).

As a result of the determination in the step S604, when no response to the initial setting command has been received, the CPU 102 sets the second communication speed, which is higher than the first communication speed, for the control unit 101 (step S605) (for example, the step S506 in FIG. 5). Then, the CPU 102 carries out the communication reset process (step S606) (for example, the steps S507 to S509 in FIG. 5), followed by the process returning to the step S601.

As a result of the determination in the step S604, when the response to the initial setting command has been received, the CPU 102 transmits the setting request command to the printer unit 117 through the communication at the first communication speed (step S607) (for example, the step S406 in FIG. 4). Then, the CPU 102 determines whether or not a response to the setting request command has been received from the printer unit 117 (step S608).

When the CPU 102 determines in the step S608 that no response to the setting request command has been received from the printer unit 117, the process returns to the step S607. On the other hand, as a result of the determination in the step S608, when the response to the setting request command has been received from the printer unit 117, the CPU 102 sets the second communication speed for each of the control unit 101 and the printer unit 117 (step S609) (for example, the steps S408 and S409 in FIG. 4). After that, the CPU 102 ends the present process.

According to the present embodiment described above, when the first communication speed is set for the control unit 101 after the second communication speed is set of for each of the control unit 101 and the printer unit 117, and besides, the printer unit 117 does not respond to the initial setting command, the second communication speed is set for the control unit 101. Here, when the printer unit 117 does not respond to the initial setting command, the communication speed for the printer unit 117 is thought to be the second communication speed. Accordingly, in the present embodiment, when the first communication speed is set for the control unit 101 after the second communication speed is set for each of the control unit 101 and the printer unit 117, and besides, when the printer unit 117 does not respond to the initial setting command, the second communication speed is set for the control unit 101. As a result, the second communication speed is set for both the control unit 101 and the printer unit 117, and this prevents communication from becoming impossible.

Moreover, in the present embodiment described above, when the communication speed is changed only for the control unit 101 out of the control unit 101 and the printer unit 117, the communication reset process is carried out, and hence a situation in which communication is impossible is prevented from continuing.

Furthermore, in the present embodiment described above, when the control unit 101 is not normally operating, the operation reset process for the control unit 101 is carried out, and hence the control unit 101 is prevented from continuing to operate abnormally.

In the present embodiment described above, since the printer unit 117 is a printer engine which carries out the printing process, transmission and receipt of image data or the like is prevented from becoming impossible because of a communication speed setting in the printing process.

In the present embodiment described above, even when the communication speed is changed only for the control unit 101 out of the control unit 101 and the printer unit 117, the communication reset process does not have to be carried out when communication at the changed communication speed is possible. Namely, as long as communication between the control unit 101 and the printer unit 117 is possible after the process in the step S506 is carried out, the processes in the steps S507 and the subsequent steps are not carried out. This prevents the communication reset process from being unnecessarily carried out even though communication between the control unit 101 and the printer unit 117 is possible.

Moreover, in the present embodiment described above, the watchdog unit 114 may transmit the operation reset signal to the printer unit 117 as well. This prevents communication from becoming impossible due to the operation reset process being carried out only by the control unit 101.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-041114, filed Mar. 3, 2016, which is hereby incorporated by reference herein in its entirety.

What is claimed is:

1. A printing apparatus comprising:
a printer unit configured to print an image based on the received image data and set a communication speed of itself to a first communication speed or a second communication speed different from the first communication speed; and
an interface configured to set a communication speed of itself to the first communication speed or the second communication speed and transmit a command to the printer unit at the communication speed set to itself,
wherein, in a case where the interface is reset,
the interface sets the communication speed of itself to the first communication speed, and the interface transmits a first command to the printer unit at the first communication speed, and
the interface sets, in a case where a response to the first command transmitted at the first communication speed is not received from the printer unit before a predetermined time period has elapsed after transmission of the first command, the communication speed of itself to the second communication speed, and the interface transmits a second command to the printer unit at the second communication speed.

2. The printing apparatus according to claim 1, wherein, based on the second command, the printer unit sets the communication speed of itself to the first communication speed.

3. The printing apparatus according to claim 2, wherein the second command is a reset command, and the printer unit carries out a reset process based on the reset command.

4. The printing apparatus according to claim 1, wherein the interface transmits, in a case where the response to the first command transmitted at the first communication speed is received from the printer unit before the predetermined time period has elapsed after the transmission of the first command, a third command for setting the communication speed of the printer unit to the second communication speed.

5. The printing apparatus according to claim 1, wherein the first command is an initial setting command for setting the communication speed of the printer unit to the first communication speed.

6. The printing apparatus according to claim 1, wherein the second communication speed is higher than the first communication speed.

7. The printing apparatus according to claim 1, further comprising a processing unit configured to cause the interface to set the communication speed of itself and/or the printer unit to set the communication speed of itself.

8. The printing apparatus according to claim 7, further comprising a monitoring unit configured to monitor the processing unit and cause the interface to reset the communication speed of the interface based on a monitoring result of the processing unit.

9. The printing apparatus according to claim 2, wherein, the printer unit transmits a response to the second command based on the second command, and the interface sets the communication speed of itself to the first communication speed.

10. The printing apparatus according to claim 4, wherein the printer unit transmits a response to the third command and sets the communication speed of itself to the second communication speed, and the interface sets the communication speed of itself to the second communication speed based on the response to the third command.

11. The printing apparatus according to claim 1, further comprising an image processing unit configured to subject image data to image processing,
wherein the interface further transmits the image data subjected to the image processing by the image processing unit.

12. A control method for a printing apparatus including an interface and a printer unit, comprising:
setting a communication speed of the interface to a first communication speed;
transmitting a first command to the printer unit at the set first communication speed;
setting a communication speed of the printer unit to the first communication speed based on the first command;
transmitting a second command to the printer unit based on a response to the first command received from the printer unit;
setting the communication speed of the interface to the second communication speed;
setting the communication speed of the printer unit to the second communication speed based on the transmitted second command;
resetting the communication speed of the interface to the first communication speed;
transmitting the first command to the printer unit at the reset first communication speed;
setting the communication speed of the interface to the second communication speed in a case where the interface does not receive the response to the first command from the printer unit before a predetermined time has elapsed after transmission of the first command at the reset first communication speed; and
transmitting a third command to the printer unit at the second communication speed.

13. A non-transitory computer-readable storage medium storing a program for causing a computer to execute a control method for a printing apparatus including an interface and a printer unit, the control method for the printing apparatus comprising:
setting a communication speed of the interface to a first communication speed;
transmitting a first command to the printer unit at the set first communication speed;
setting a communication speed of the printer unit to the first communication speed based on the first command;
transmitting a second command to the printer unit based on a response to the first command received from the printer unit;
setting the communication speed of the interface to the second communication speed;
setting the communication speed of the printer unit to the second communication speed based on the transmitted second command;
resetting the communication speed of the interface to the first communication speed;
transmitting the first command to the printer unit at the reset first communication speed;
setting the communication speed of the interface to the second communication speed in a case where the interface does not receive the response to the first command from the printer unit before a predetermined time has elapsed after transmission of the first command at the reset first communication speed; and
transmitting a third command to the printer unit at the second communication speed.

* * * * *